United States Patent [19]

Hama

[11] Patent Number: 4,518,238

[45] Date of Patent: May 21, 1985

[54] ROTATION CONTROL MECHANISM FOR DIAPHRAGM-OPERATING RING IN INTERCHANGEABLE OBJECTIVE FOR PHOTOGRAPHIC CAMERA

[75] Inventor: Yoshihiro Hama, Tokyo, Japan

[73] Assignee: Asahi Kogaku Kogyo Kabushiki Kaisha, Tokyo, Japan

[21] Appl. No.: 520,723

[22] Filed: Aug. 5, 1983

[30] Foreign Application Priority Data

Aug. 18, 1982 [JP] Japan .................. 57-124728[U]

[51] Int. Cl.³ .................................................. G03B 9/02
[52] U.S. Cl. ..................................................... 354/270
[58] Field of Search .............................. 354/270–274; 350/449, 450

[56] References Cited

U.S. PATENT DOCUMENTS

| | | | |
|---|---|---|---|
| 2,878,738 | 3/1959 | Uhland | 354/270 |
| 3,135,185 | 6/1964 | Grosjean | 354/270 |

FOREIGN PATENT DOCUMENTS

| | | | |
|---|---|---|---|
| 1086993 | 8/1960 | Fed. Rep. of Germany | 354/270 |
| 227093 | 1/1969 | U.S.S.R. | 354/270 |

Primary Examiner—John Gonzales
Attorney, Agent, or Firm—Christie, Parker & Hale

[57] ABSTRACT

An interchangeable objective with a variable lens aperture for a camera has a stationary support member and a diaphragm-operating member rotatable about an axis between first and second annular positions relative to the stationary support member. A first elongated leaf spring is mounted on the stationary member to bear against the diaphragm-operating member along a first plane perpendicular to the axis. A second elongated leaf spring is mounted on the stationary member to bear against the diaphragm-operating member along a second plane perpendicular to the axis. The second plane is spaced from the first plane in the direction of the axis. A locking groove is formed in the diaphragm-operating member so as to alternatively receive the first and second leaf springs in locking engagement when the diaphragm-operating member is positioned at the first and second angular positions, respectively. An unlocking button is mounted in the diaphragm-operating member over the locking groove to push the respective first and second leaf springs out of engagement with the locking groove upon depression of the unlocking button.

7 Claims, 18 Drawing Figures

ROTATION CONTROL MECHANISM FOR DIAPHRAGM-OPERATING RING IN INTERCHANGEABLE OBJECTIVE FOR PHOTOGRAPHIC CAMERA

CROSS REFERENCE TO RELATED APPLICATIONS

This application is related to application Ser. No. 520,724, filed on even date herewith by Etsuro Nishio and Zenichi Okura, the disclosure of which is incorporated fully herein by reference.

BACKGROUND OF THE INVENTION

The present invention relates to an interchangeable objective provided with a diaphragm-operating ring which is rotatable between a rotatable range for diaphragm preset and a position for automatic diaphragm regulation and, more particularly, to a rotation control mechanism for the diaphragm-operating ring used for changeover between said rotatable range for diaphragm preset and said position for automatic diaphragm regulation.

A photographic camera of automatic exposure control type conventionally has a diaghragm priority mode in which a diaphragm value is preset by the user and a shutter speed for appropriate exposure is automatically regulated in the camera body, a shutter speed priority mode in which, inversely, a shutter speed is manually preset by the user and a lens aperture for appropriate exposure is automatically regulated, and a programmed mode in which a combination of diaphragm value and shutter speed is automatically regulated for appropriate exposure.

Interchangeable objectives used with a photographic camera adopting said three modes of automatic exposure control function or different exposure control functions must include a diaphragm-operating ring provided with a rotatable range for manually presetting the diaphragm value (referred to hereinafter as M-range), in said diaphragm priority mode and a position for automatic diaphragm regulation (referred to hereinafter as A-position) in said shutter speed priority mode and said programmed mode. Information as to whether the diaphragm-operating ring occupies the M-range or the A-position must be transferred to the camera body because different exposure control mechanisms are activated in these two cases.

Any unintentional changeover between the M-range and the A-position must be reliably prevented and, in consequence, a suitable changeover locking mechanism and unlocking mechanism are required. However, the structure for connection between the lens barrel and the camera body has made it difficult to obtain a large rotation angle for changeover between the end of the M-range and the A-position. This has given rise to various problems with respect not only to the strength but also to the degree of freedom for their design. Particularly in an objective of a relatively large diameter, the rotation angle within the M-range must be large but the rotation angle of a diaphragm information transferring lever which is rotatable together with the diaphragm-operating ring is restricted by the claw angle of the mount ring, so that the strength of the changeover locking mechanism may be compromised.

SUMMARY OF THE INVENTION

According to the invention, an interchangeable objective with a variable lens aperture for a camera has a stationary support member and a diaphragm-operating member rotatable about an axis between first and second annular positions relative to the stationary support member. (One angular position is the A-position and the other angular position is the end of the M-range nearest to the A-position.) A first elongated leaf spring is mounted on the stationary member to bear against the diaphragm-operating member along a first plane perpendicular to the axis. A second elongated leaf spring is mounted on the stationary member to bear against the diaphragm-operating member along a second plane perpendicular to the axis. The second plane is spaced from the first plane in the direction of the axis. A locking groove is formed in the diaphragm-operating member so as to alternatively receive the first and second leaf springs in locking engagement when the diaphragm-operating member is positioned at the first and second angular positions, respectively. An unlocking button is mounted in the diaphragm-operating member over the locking groove to push the respective first and second leaf springs out of engagement with the locking groove upon depression of the unlocking button. As a result of the placement of the leaf springs in different planes, a small rotation angle can be provided for changeover between the M-range and the A-position, without compromising the strength of the changeover locking mechanism.

BRIEF DESCRIPTION OF THE DRAWINGS

The feature of specific embodiments of the best mode contemplated of carrying out the invention are illustrated in the drawings, in which.

DETAILED DESCRIPTION OF THE SPECIFIC EMBODIMENTS

Figure 1:
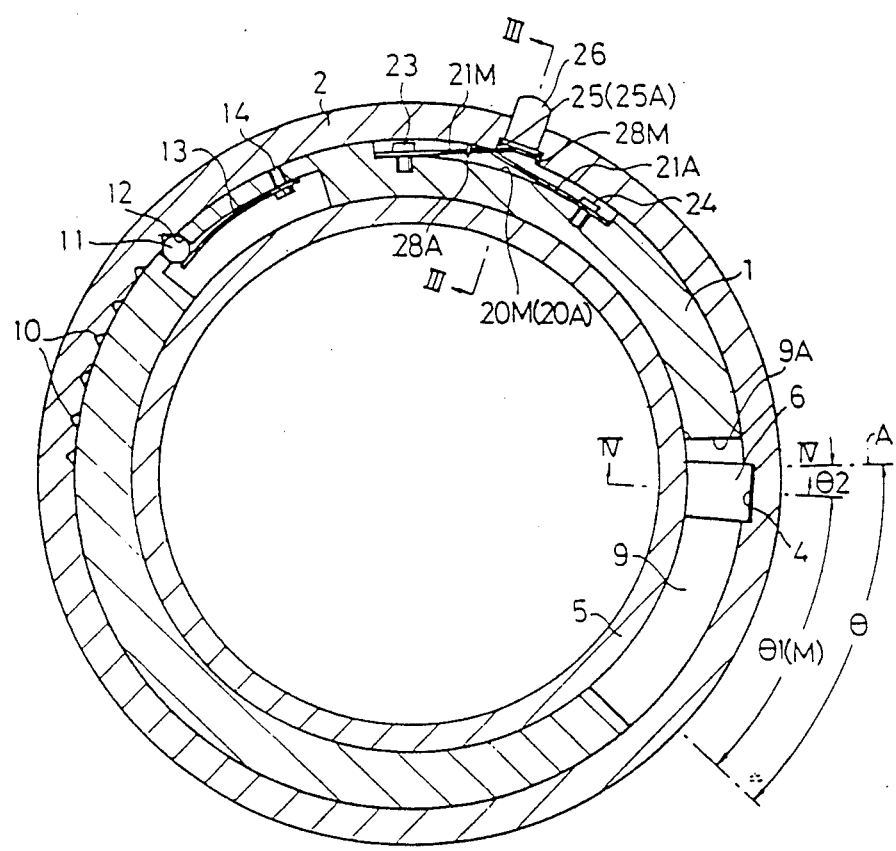
FIGS. 1 and 2 are front-sectional view of the pertinent parts of an interchangeable objective embodying principles of the invention, FIG. 1 showing the objective in the M-range and FIG. 2 showing the objective in the A-position.

In FIGS. 1 through 4, reference numeral 1 designates a stationary mount support ring, and reference numeral 2 designates a diaphragm-operating ring rotatably supported by said mount support ring 1. A mount 3 by which the objective is attached to the camera body is fixed to the mount support ring 1. The diaphragm-operating ring 2 is provided in its inner peripheral surface with an interlocking groove 4 into which an interlocking pin 6 fixedly mounted on a diaphragm-rotating ring 5 is engaged so that said diaphragm-rotating ring 5 may be rotated together with said diaphragm-operating ring 2. This diaphragm-rotating ring 5 is rotatably supported along the inner peripheral surface of the mount support ring 1 and is integrally provided with a diaphragm information transferring lever 8 projecting through a notch 7 formed in the mount 3 toward the camera body. Said diaphragm information transferring lever 8 is adapted to transfer information to the camera body whether said diaphragm information transferring lever 8 occupies the M-range or the A-position of the diaphragm operating ring 2. The diaphragm-rotating ring 5 is rotated to activate the diaphragm mechanism of well known type and thereby to preset a desired diaphragm value. Since such diaphragm mechanism is not part of the present invention, it is not described in detail.

The rotation angle of the diaphragm operating ring 2 is restricted by the circumferential length of the interlocking groove 9 formed in the mount support ring 1, in which said interlocking pin 6 rides. Both the M-range and the A-position are contained within an angle $\theta$ of the interlocking groove 9. In this embodiment, the M-range is arranged to cover an angle $\theta_1$ and the A-position is arranged to be spaced by an angle $\theta_2$ from one rotational end of said M-range (e.g., the minimum lens aperture position).

The diaphragm-operating ring 2 is provided in its inner peripheral within an angular extent corresponding to said M-range with a plurality of click-grooves 10 equal in number to the number of diaphragm value steps. The mount support ring 1 is formed with a guide hole 12 for containment of a click-ball 11 adapted to be received by said click-grooves 10 and a leaf spring 13 is fixed at one end by a screw 14 to the mount support ring 1 so as to bias said click ball 11 toward the click-grooves 10.

The present invention is generally directed to the control of the rotation of the diaphragm-operating ring 2 between said one rotational end of the M-range (the minimum lens aperture) and the A-position. To this end, two leaf springs 21M, 21A serving as rotation arresting members are secured at one end by screws 23, 24 respectively to the mount support ring 1. Leaf springs 21M, 21A are mounted in leaf spring receiving grooves 20M, 20A respectively, are offset from each other in the direction of the optical axis, and face toward each other. The diaphragm-operating ring 2 is provided with a locking groove 25 and an unlocking member (button) 26 projecting outwardly from the upper boundary of this locking groove 25. Locking groove 25 is elongated in the direction of the optical axis to overlie both of grooves 20M, 20A in communication therewith. The bottom of unlocking member 26 has a plate that spans the space between grooves 20M, 20A and alternately engages members 21M, 21A as they enter locking groove 25.

Figure 5:
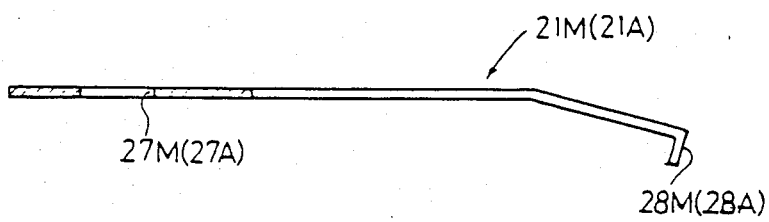
FIG. 5 is a side, partially cut-away view of one of the rotation-arresting members shown in FIGS. 1 and 2.

The rotation arresting members 21M, 21A each comprise, as one of them is shown by FIG. 5, leaf springs formed at one end with a hole (27M, 27A) for fixation and at the other end with an arresting surface (28M, 28A). The portion of each leaf spring with the hole (27M, 27A) extends away from the receiving groove (20M, 20A) toward the locking groove. These rotation arresting members 21M, 21A are secured to the mount support ring 1 in a symmetrical relationship with respect to the optical axis so that said arresting surfaces 28M, 28A cross one another in a front view. The rotation arresting member 21M has its arresting surface 28M bearing against one of side walls (M-locking side wall) 25M circumferentially defining the locking groove 25 of the diaphragm-operating ring 2, as shown in FIG. 1, to arrest further rotation of said diaphragm operating ring 2, toward the A-position, when the diaphragm-operating ring 2 has been rotated to the minimum lens aperture position within the M-range. Accordingly, this arresting member may be referred to as the rotation arresting member 21M for M.

Figure 2:
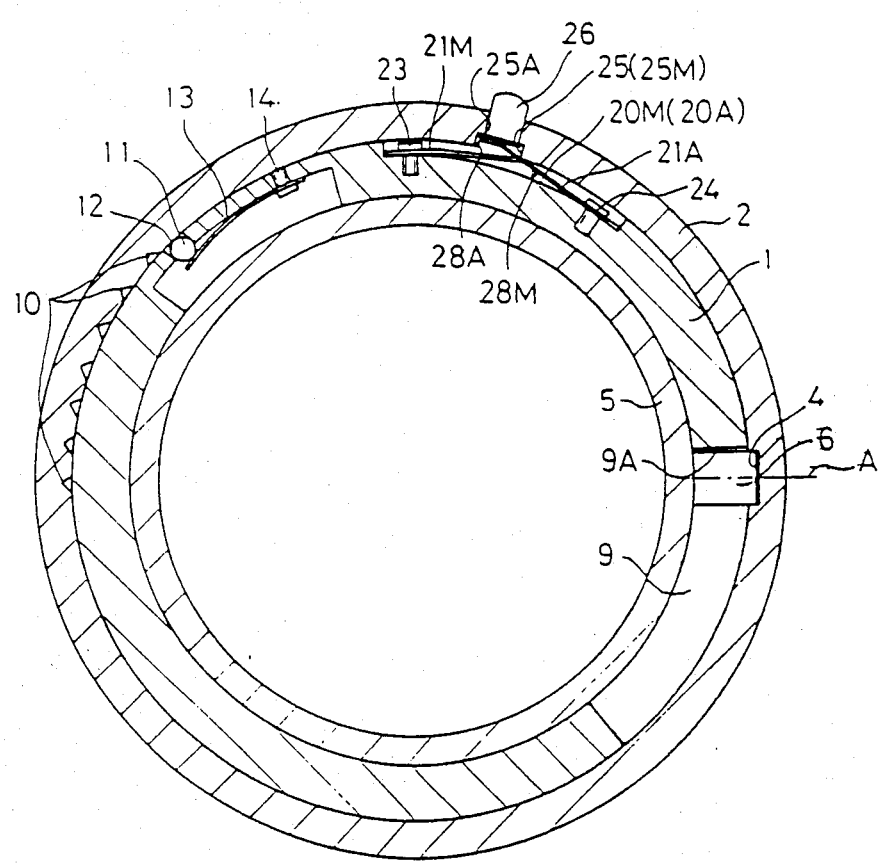
Figure 3:
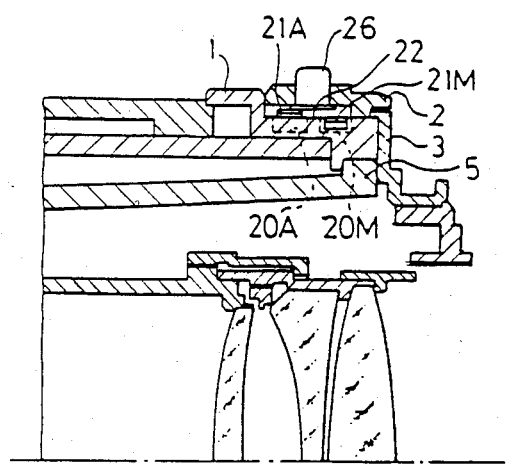
FIGS. 3 and 4 are sectional views of the objective taken through lines III—III and IV—IV in FIG. 1, respectively.
Figure 4:
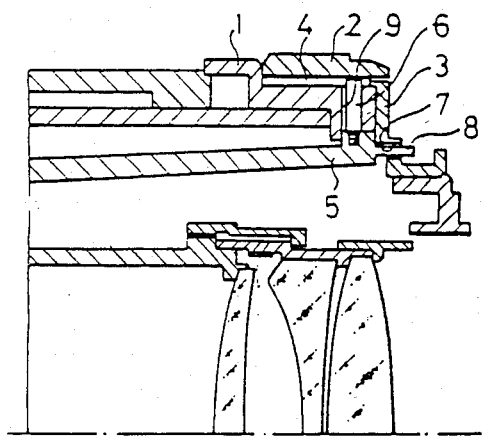

The other rotation arresting member 21A has its arresting surface 28A bearing against the other side wall (A-locking side wall) 25A circumferentially defining the locking groove 25 of the diaphragm operating ring 2, as shown in FIG. 2, to arrest further rotation of said diaphragm-operating ring 2 toward the M-range, when said diaphragm-operating ring 2 has been rotated to the A-position. Accordingly, this arresting member may be referred to as the rotation arresting member 21A for A.

Said unlocking member 26 is engageable with the outer surfaces of these two rotation arresting members 21M, 21A so that depression of unlocking member 26 permits said both rotation arresting members to be displaced out of the locking groove 25 under the effect of elastic deformation.

Figure 6A:
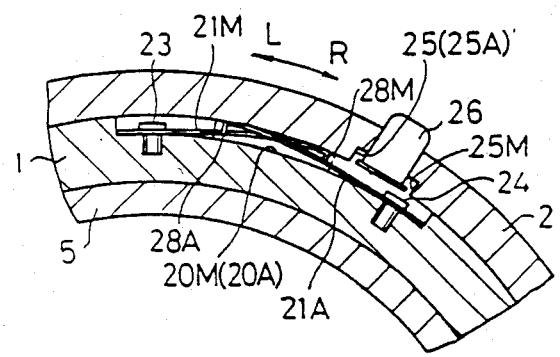
FIGS. 6a through 6f are enlarged, front-sectional views of part of the objective in different positions of the diaphragm-operating ring.

Thus, the diaphragm-operating ring 2 of the interchangeable objective constructed according to the present invention is controlled in the following manner. Within the M-range, both rotation arresting members 21M, 21A for M and A, respectively, are forcibly deflected by the inner surface of the diaphragm-operating ring 2 inwardly, as shown in FIG. 6a, unless said diaphragm-operating ring 2 is rotated to the minimum lens aperture position. In consequence, these arresting members are never received by the locking groove 25 and the diaphram-operating ring 2 is freely rotatable in the directions both of arrows R and L.

Figure 6B:
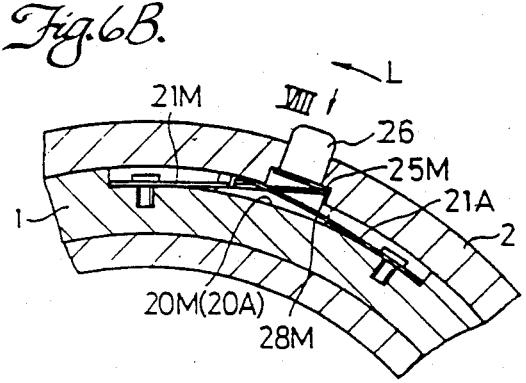
Figure 7A:
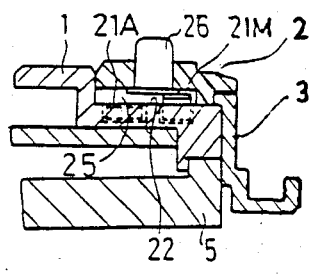
FIGS. 7a through 7c are enlarged, side-sectional views of part of the objective in different positions of the diaphragm-operating ring.
Figure 8A:
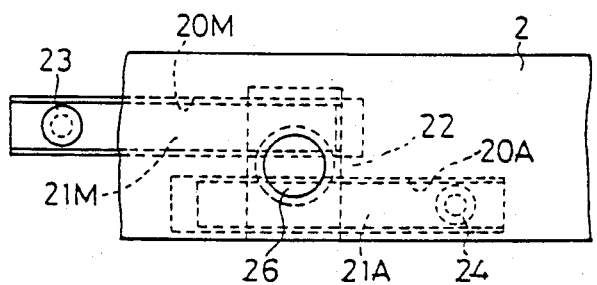
FIGS. 8a and 8b are top views as seen in the direction of VIII—VIII in FIGS. 6b and 6e, respectively.

When the diaphragm-operating ring 2 has been rotated in the direction as indicated by the arrow L (FIGS. 6a, b, c) to the minimum lens aperture position, the arresting surface 28M of the rotation arresting members 21M for M bears against the M-locking side wall 25M of the locking groove 25, thereby arresting further rotation of the diaphragm-operating ring in the direction of the arrow L, i.e., toward the A-position, as shown in FIG. 6b, FIG. 7a and FIG. 8a. Now the diaphragm-operating ring 2 is freely rotatable toward the maximum lens aperture position (i.e., upon rotation in this direction, the corner of the locking groove 25 deflects the arresting member 21M downward).

Figure 6C:
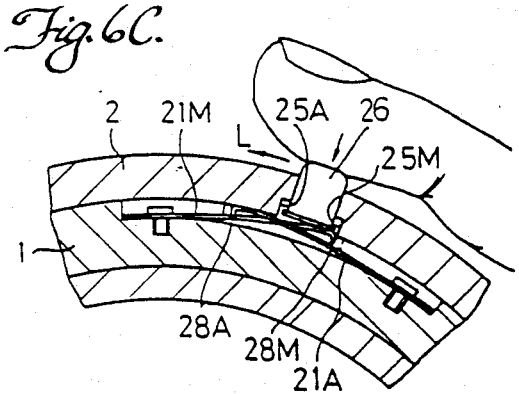
Figure 6D:
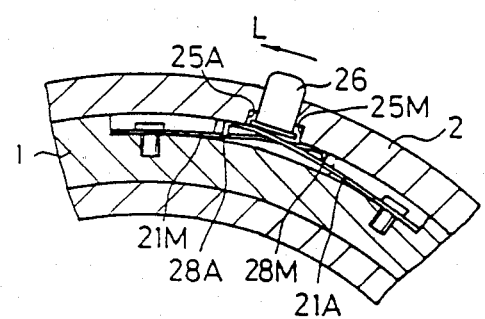
Figure 6E:
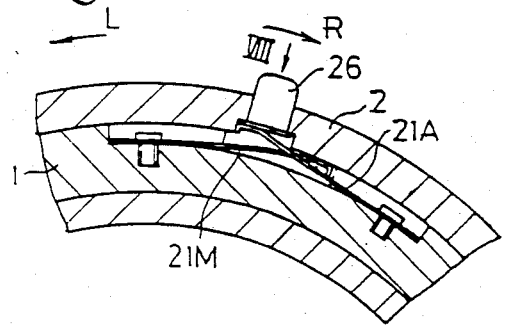
Figure 7B:
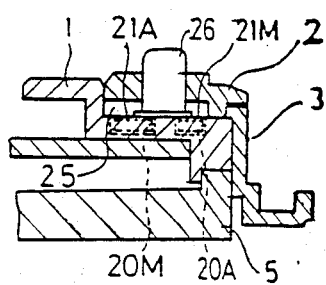
Figure 7C:
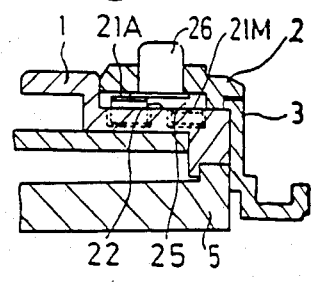
Figure 8B:
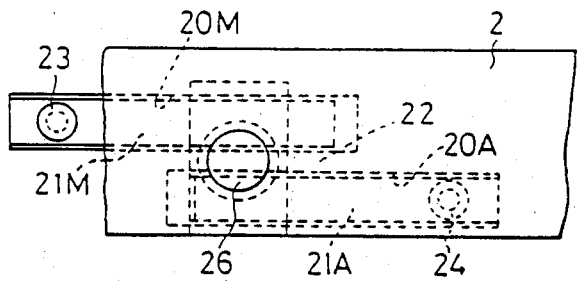

To rotate the diaphragm-operating ring 2 to the A-position, the unlocking member 26 is depressed to disengage the arresting surface 28M of the rotation arresting member 21M for M from the M-locking side wall 25M, as seen in FIGS. 6c and 7b. From such a state the diaphragm-operating ring 2 may be rotated in the direction of the arrow L, i.e., toward the A-position. When the diaphragm-operating ring has been rotated to the A-position, the arresting surface 28A of the rotation arresting members 21A for A is engaged with the A-locking side wall 25A of the locking groove 25, as seen in FIGS. 6e, 7b, and 8b, thereby arresting rotation of the diaphragm-operating ring 2 in the direction of the arrow R, i.e., toward the M-range. The rotation in the direction of the arrow L is arrested by the interlocking pin 6 on the diaphragm-rotating ring 5 abutting an end 9A of the interlocking groove 9 formed in the support ring 1.

Figure 6F:
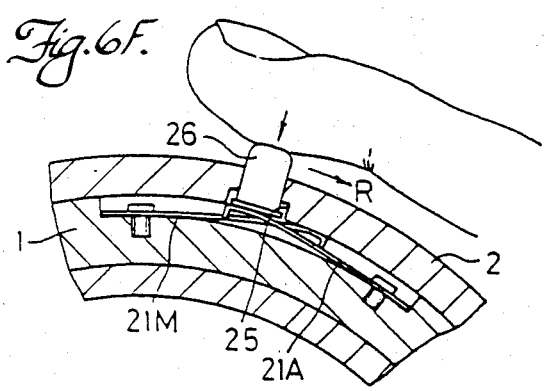

To bring the diaphragm-operating ring 2 back to the M-range, the unlocking member 26 is depressed to displace the rotation arresting member 21A for A inwardly, as shown in FIG. 6f, thereby disengaging the arresting surface 28A from the A-locking side wall 25A. From this state, the diaphragm-operating ring 2 may be rotated toward the M-range. In the embodiment described hereinabove, the two rotation arresting members 21M, 21A are located in the leaf spring grooves 20M, 20A, respectively, and there is provided between these both leaf spring grooves 20M, 20A a land (position control surface) 22 adapted to control the maximum displacement of the unlocking member 26. As a result, smooth operation is assured without extreme deformation of the rotation arresting members 21M, 21A.

Figure 9:
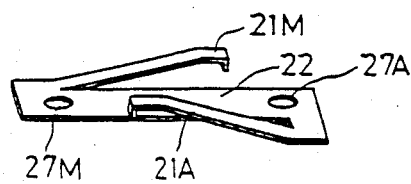
FIG. 9 is a perspective view of another embodiment of the rotation-arresting members.

FIG. 9 shows another embodiment of the rotation arresting members 21M, 21A. According to this embodiment, both rotation arresting members 21M, 21A for M and A, respectively, are formed in a one piece construction from a single piece of leaf spring material; there is provided between both arresting members a common surface for position control 22.

Figure 10:
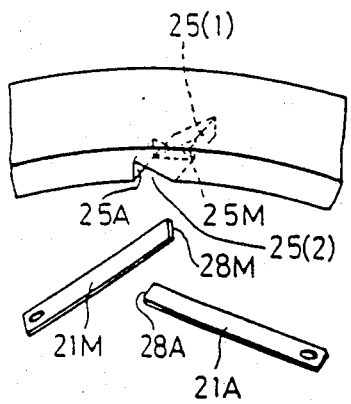
FIG. 10 is a perspective view of yet another embodiment of the locking groove in the diaphragm-operating ring and the rotation-arresting members.

In another embodiment shown in FIG. 10, the locking groove 25 formed in the diaphragm-operating ring 2 comprises a combination of two locking grooves 25(1), 25(2) of triangular cross-sections, respectively, including M-locking side wall 25M and A-locking side wall 25A. In this embodiment, the rotation arresting members 21M, 21A may be formed from a linear, i.e., straight, leaf spring material and the forward ends of the respective rotation arresting members 21M, 21A may function as arresting surfaces 28M, 28A.

It should be noted here that the mount support ring 1 according to the present invention is a non-rotatable member adapted for rotatable support of the diaphragm-operating ring 2.

It will be understood from the foregoing description that, in accordance with the present invention, change-over of the diaphragm-operating ring between the M-range and the A-position is accomplished by using two rotation arresting members comprising leaf springs for M-range and A-position, respectively, and the opposite side walls circumferentially defining the locking groove of the diaphragm-operating ring, which may be disengageably engaged with said both rotation arresting members. These both rotation arresting members are offset in the direction of the optical axis and displaceable by depression of the single unlocking member. Thus, it is possible to reduce the rotation angle for changeover between the M-range and the A-position by suitably arranging the positions of the respective leaf springs serving as rotation arresting members so that the degree of design freedom may be improved and the desired strength may be maintained. Furthermore, the change-over between the M-range and the A-position can be achieved merely by depressing the single unlocking member with a high maneuverability.

The disclosure of Japanese Utility Model Application No. 1982-124728, Japanese Utility Model Gazette No. 59(1984)-30123, laid open Feb. 24, 1984, is incorporated fully by reference.

What is claimed is:

1. An interchangeable objective with a variable lens aperture for a camera comprising:
    a stationary support member;
    a diaphragm-operating member rotatable about an axis between first and second angular positions relative to the stationary member;
    a first elongated leaf spring mounted on the stationary member to bear against the diaphragm-operating member along a first plane perpendicular to the axis;
    a second elongated leaf spring mounted on the stationary member to bear against the diaphragm-operating member along a second plane perpendicular to the axis, the second plane being spaced from the first plane in the direction of the axis;
    locking groove means formed in the diaphragm-operating member so as alternately to receive the first and second leaf springs in locking engagement when the diaphragm-operating member is positioned at the first and second angular positions, respectively; and
    an unlocking button mounted in the diaphragm-operating member over the locking groove means to push the respective first and second leaf springs out of engagement with the locking groove means upon depression of the locking button.

2. The objective of claim 1, in which the stationary members has annular mounting groove means in communication with the locking groove means in which the first and second leaf springs are mounted.

3. The objective of claim 2, in which each leaf spring comprises a first elongated portion attached to the stationary member in the mounting groove means and extending away therefrom toward the locking groove means and a second elongated portion forming an obtuse angle with the first portion and adapted to fit in the locking groove means.

4. The objective of claim 3, in which the locking groove means has a rectangular cross-section with opposite corners and each leaf spring additionally comprises a third portion extending at an angle of about 90° from the end of the second portion such that the intersection of the second and third portions fits into one of the corners of the locking groove means when such leaf spring is in locking engagement therewith, the intersections of the leaf springs fitting in the respective opposite corners of the locking groove means.

5. The objective of claim 2, in which the first and second leaf springs are straight and face toward each other and the locking groove means comprise first and second grooves having oppositely oriented triangular cross-sections with respective apexes adapted to receive the ends of the respective first and second leaf springs.

6. The objective of claim 2, in which the first and second leaf springs are formed of respective first and second pieces of spring material.

7. The objective of claim 2, in which the first and second leaf springs are formed of a single piece of spring material.

* * * * *